United States Patent [19]
Pralle

[11] Patent Number: 4,864,878
[45] Date of Patent: Sep. 12, 1989

[54] FARM PLANTER AND SPRAYER PUMP ASSEMBLY

[76] Inventor: Tod R. Pralle, R.R. 1, Alexander, Iowa 50420

[21] Appl. No.: 329,440

[22] Filed: Mar. 28, 1989

Related U.S. Application Data

[63] Continuation of Ser. No. 126,557, Nov. 30, 1987, abandoned.

[51] Int. Cl.$^4$ ............................................. F16H 37/00
[52] U.S. Cl. ..................................... 74/15.6; 180/53.1
[58] Field of Search ............ 74/11, 15.2, 15.6, 665 F, 74/665 G, 665 GE; 417/360, 362; 180/53.1, 53.6

[56] References Cited

U.S. PATENT DOCUMENTS

| | | | |
|---|---|---|---|
| 2,851,896 | 9/1958 | Ordway | 74/413 |
| 2,940,534 | 6/1960 | Chattin | 180/53.1 |
| 3,845,832 | 11/1974 | Glover | 180/14 R |
| 4,733,738 | 3/1988 | Rowe | 180/53.1 |

FOREIGN PATENT DOCUMENTS 1583643 1/1981 United Kingdom ................ 417/362

Primary Examiner—Allan D. Herrmann
Assistant Examiner—Janice E. Chartoff
Attorney, Agent, or Firm—Henderson & Sturm

[57] ABSTRACT

The invention comprises a shaft unit adapted for an in-line connection with the power takeoff of a tractor, with a sprocket wheel of a belt-drive centrifugal pump for driving the pump to supply hydraulic power to spraying equipment pulled by the tractor, and further with a hydraulic pump for driving that pump for driving that pump to supply hydraulic power to planting equipment pulled by the tractor, the shaft unit comprising a pair of straight shafts releasably locked in inserted, releasable relationship with each other within the centrifugal pump sprocket wheel, and extending therefrom to the power takeoff on one side of the sprocket wheel and to the hydraulic pump on the other side of the sprocket wheel.

8 Claims, 3 Drawing Sheets

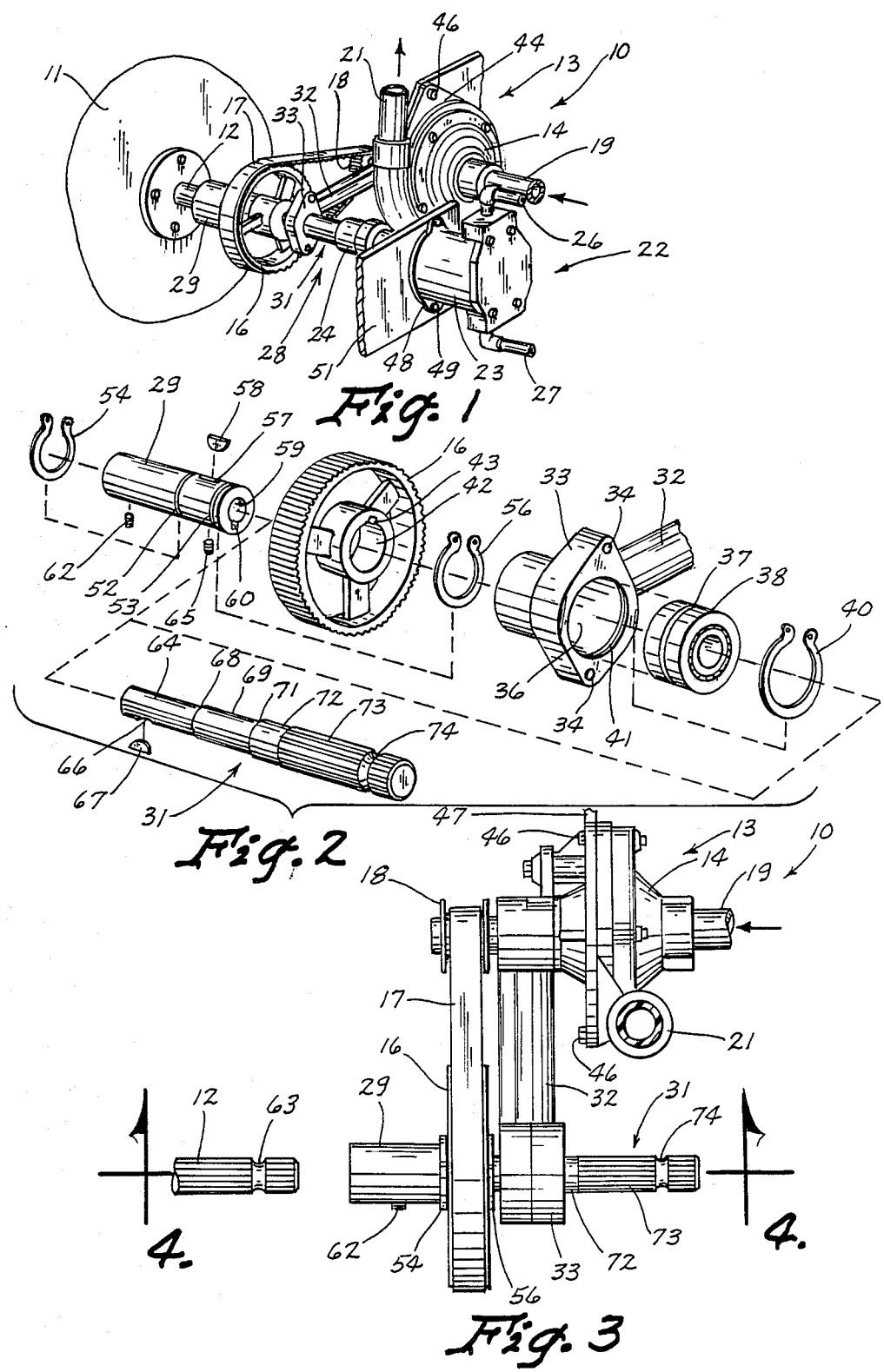

FARM PLANTER AND SPRAYER PUMP ASSEMBLY

This is continuation of co-pending application Ser. No. 07/126,557 filed on Nov. 30, 1987, now abandoned.

TECHNICAL FIELD

The present invention relates generally to farm planting and spraying equipment, and more particularly to a pump assembly for operating off a tractor PTO to supply hydraulic power to the planting and spraying equipment.

BACKGROUND ART

A conventional farm tractor comes equipped with a power takeoff (PTO) and of course a hydraulic system, including a pump for operating conventional lift apparatus, for example a three-point hitch assembly mounted at the rear of the tractor. With large capacity grain planters being pulled by the tractor, the hydraulic system may not have enough capacity to operate the planter, particularly air pressure type planters, therefore the planter manufacturer may provide its own hydraulic pump for connection to the PTO. However, with the advent of the provision of spraying insecticides and the like in conjunction with planting, the insecticide sprayer required—in many instances, its own pump. One example of a pump developed for that purpose is a belt drive centrifugal pump, Series 9400, driven off the PTO, under the trade name Hypro, manufactured by Lear Siegler, Inc. Nevertheless, the operator could use only one pump at a time off the single PTO.

One effort to drive both pumps, the hydraulic pump and the Hypro pump, off a single PTO is known; however as will be explained in detail hereinafter, that effort required physical changes and alterations to both pumps, plus machining of one pump, the result being a single assembled unit. Although not impossible to disassemble and remake into two separate pumps again, such action is very time consuming and complicated.

DISCLOSURE OF THE INVENTION

The invention relates to a conventional farm tractor having a power takeoff and pulling a planting apparatus to which a crop spraying apparatus is attached.

The invention comprises a belt driven centrifugal pump having an arm releasably receiving a drive shaft unit drivingly connected in turn to the PTO, the drive shaft unit itself comprising a first shaft engaged with the PTO and a second shaft releasably engaged with the first shaft and pump arm and releasable, drivingly engaged with a hydraulic pump. The centrifugal pump is fluidly connected to operate conventional spraying equipment, and the hydraulic pump is fluidly connected to operate conventional planting equipment.

In operation, both pumps are operated simultaneously off the PTO by a linear drive; and subsequent to operation, simple disengagement of the shaft unit from the pumps leaves both pumps in condition for separate and individual use without extensive modifications.

By this arrangement, conventional original equipment may be used, which—although slightly modified to achieve the intended advantages, may be readily assembled and disassembled by the average farm operator; such that two pumps, one used for spraying equipment and one for planting equipment may be easily combined for receiving drive simultaneously from a single PTO, or may easily be used separately and independently of each other. Furthermore, by removing a pump from the hydraulic system and utilizing the PTO drive, considerable horse power is saved plus saving wear and tear on the hydraulic system.

It is an object of this invention to provide a new and novel pump assembly for supplying hydraulic operating power to independent spraying and planting equipment towed by a conventional farm tractor.

It is another object of this invention to provide an improved pump assembly for supplying power to both spraying and planting equipment wherein the pump assembly is driven completely off a tractor PTO, thus not using the hydraulic system to supply power and thereby saving horse power.

Yet another object of this invention is to provide a simple shaft unit for providing in-line drive simultaneously to both a hydraulic pump and a centrifugal drive pump, and with the shaft unit directly engaged with a tractor PTO;

Still another object of this invention is to provide a pump assembly comprised of normally independently driven pumps, one a conventional hydraulic pump and the other a convention centrifugal drive pump, and wherein by the provision of a single in-line shaft unit, both pumps may first, be driven off a single tractor PTO, and secondly, be driven simultaneously.

Another object of this invention is to provide such a unique pump assembly without modifying the internal workings of either pump, and without destroying the capability of either pump to quickly and readily operate independently of the other pump.

BRIEF DESCRIPTION OF THE DRAWINGS

These and other objects, advantages and novel features of the present invention will become apparent from the following detailed description of the invention when considered in conjunction with the accompanying drawings, wherein:

FIG. 1 :s a perspective view of the pump assembly of this invention shown engaged to the PTO of a conventional farm tractor;

FIG. 2 is an exploded view of the pump assembly;

FIG. 3 is a plan view of the pump assembly, showing the tractor PTO in exploded view;

BEST MODE FOR CARRYING OUT THE INVENTION

Figure 4:
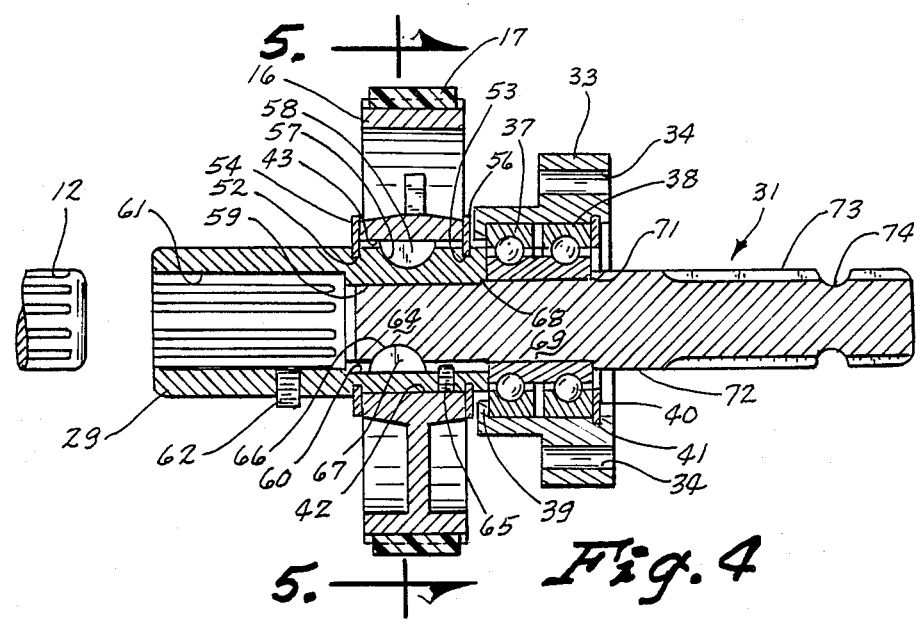
FIG. 4 is an enlarged sectional view as taken along the 4—4 in FIG. 3.
Figure 5:
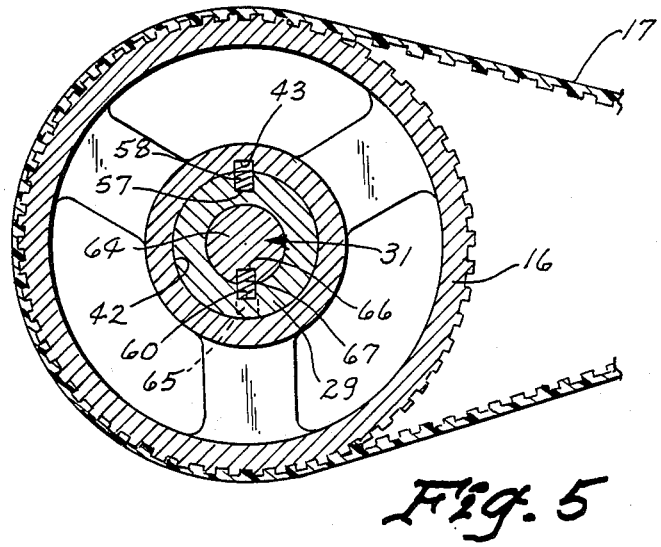
FIG. 5 a sectional view taken along the line 5—5 in FIG. 4.

The pump assembly of this invention is referred to generally at (10) in FIG. 1 and is used in connection with a conventional tractor (11) having a power takeoff shaft (12). The tractor (11) has connected thereto a conventional planter implement (not shown) utilizing air pressure type planters for dropping seeds of corn, for example, sequentially into a groove formed in soil, the seed then being covered over. The tractor (11) also has connected thereto spraying or other like equipment (not shown) for applying a liquid to the soil in conjunction with the planting. The pump assembly (10) comprises generally a first pump unit (13) (FIG. 1), which first pump unit (13) is adapted for fluid connection to the sprayer equipment (not shown) referred to hereinbefore for providing fluid power thereto, the first pump unit including a belt drive pump (14) having a large sprocket wheel (16), with an endless belt (17) driven thereby, and which belt (17) is drivingly connected to a small sprocket wheel (18) for activating the pump (14). The pump (14) is provided with a fluid inlet (19) and a fluid outlet (21).

The pump assembly (10) includes further a second pump unit (22) (FIG. 1) adapted for fluid connection to the planter implement referred to hereinbefore for providing fluid power to the one or more seed planters thereof, the second pump unit (22) including a pump (23) having an internally splined coupling (24) for releasable connection as described hereinafter to the first pump unit (13), and which pump (23) is provided with a fluid inlet (26) and a fluid outlet (27).

Lastly, the pump assembly (10) is provided with a shaft unit (28) (FIG. 1) which is adapted to be removably attached to the power takeoff, to be in driving connection with the large sprocket wheel (16) of the first pump (14) for imparting drive thereto, and to be in driving connection with the internally splined coupling (24) of the second pump (23) for imparting drive thereto. The shaft unit (28) comprises a first shaft (29) (FIG. 2) and a second shaft (31), the shafts (29) and (31) adapted to be releasably connected such that the driving connections are aligned with each other, being longitudinally aligned.

More particularly, the first pump unit (13) includes further a mounting arm (32) extended outwardly from the pump (14) proper, the outer end of which includes a plate element (33) disposed adjacent the large sprocket wheel (16), having openings (34) provided therein for attachment, if necessary, to another object, and provided further with an internal bore (36) within which is mounted a pair of longitudinally aligned bearings (37, 38). The bearings are held in place by an internal shoulder (39) of the plate element (33), and by a snap ring (40) inserted within a groove (41) formed internally within the bore (36).

The large sprocket wheel (16) of the first pump (14) has a bore (42) (FIG. 4) formed therein, and which bore (42) is provided with a key way (43). A plate (44) (FIG. 1) is provided as a part of the first pump (14), and by means of fasteners (46) the first pump unit (13) is secured to a bracket (47) which is part of the tractor (11).

The second pump (23) also includes a mounting plate (48) with fasteners (49) for securement to another bracket (51) of the tractor equipment.

Referring to the shaft unit (28) (FIGS. 2 and 4) the first shaft (29) has a pair of longitudinally spaced grooves (52, 53) formed therein for receiving snap rings (54, 56) upon insertion into the bore (42) of the large sprocket wheel (16). A slot (57) (FIGS. 2 and 4) is also formed and the first shaft (29) between the grooves (52, 53) for receiving a Woodruf key (58) for locking the first shaft (29) to the large sprocket wheel (16).

Referring to FIG. 4, the first shaft (29) is also provided with a bore (59) at the outer end, and with an internally splined bore (61) at the inner end for receiving the PTO (12). The bore (59) has a keyway (60) formed therein and is provided with a set screw (65) for purposes hereinafter described. A set screw (62) is provided for threadable engagement through the first shaft (29) and into engagement with a groove (63) (FIG. 3) formed in the exposed end of the PTO (12), when the PTO is fully inserted into the splined bore (61).

The second shaft (31) has a first portion (61) (FIG. 2) with a slot (66) formed therein for receiving a Woodruf key (67) when that portion (64) of the second shaft (31) is fully inserted into the bore (59) (FIG. 4) of the first shaft (29), the key (67) sliding through the keyway (60), with the set screw (65) locking the parts in place.

A shoulder (68) separates the first portion (68) from a second portion (69) of the second shaft (64), which second portion (69) rides within the bearings (37, 38) (FIG. 4) and with a shoulder (71) separating the second portion (69) from a third portion (72) which includes a splined area (73) for engagement with the internally splined coupling (24) of the second pump (23). A groove (74) is formed in the outer splined portion (73) for engagement by a set screw (not shown) inserted through the second pump coupling (24) for locking the second shaft (31) to the second pump coupling (24).

Figure 7:
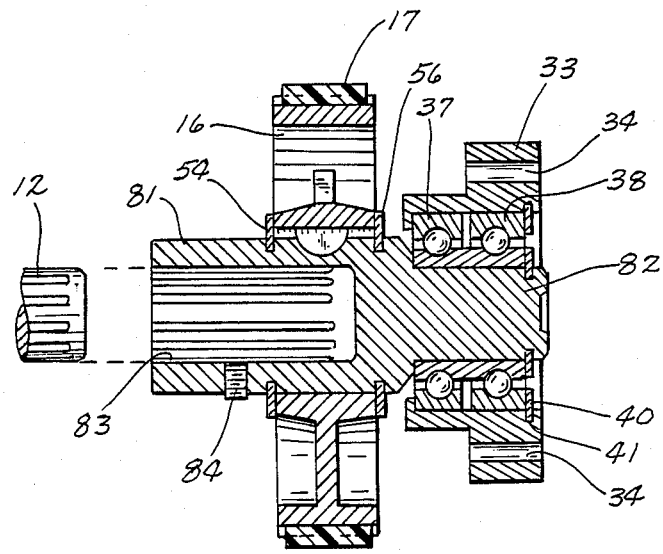
FIG. 7 is a view similar to FIG. 4 showing a prior art arrangement.

Referring to FIG. 7, a conventional prior art drive end of a pump similar to pump unit (13) for spraying purposes is shown, a coupler (81) being provided having a solid outer end (82) for riding within the mounting arm bearings (37), (38), and with an internally splined end (83) for lockingly receiving the PTO shaft (12,), utilizing a set screw (84).

The sprocket wheel (16) for driving a belt (17) is connected to the coupler (81) for rotation therewith. The plate (33) is provided with bearings (37), (38) for rotatably receiving the solid end (82), and has fasteners (not shown) for attachment of the plate (33) to a mounting element.

Figure 6:
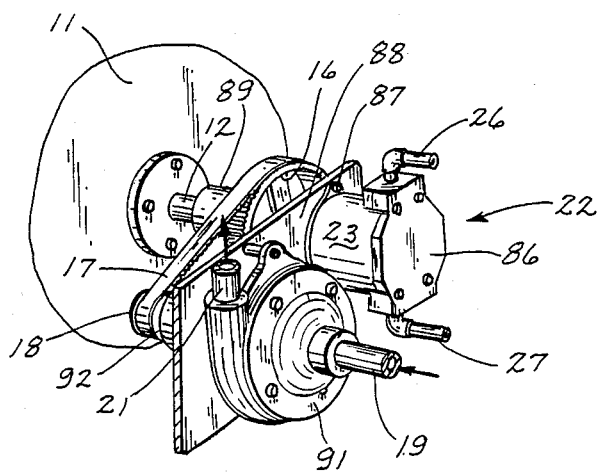
FIG. 6 is a perspective view similar to FIG. 1, and showing a prior art pump arrangement driven off a tractor PTO.

FIG. 6 shows a prior art attempt at adapting the pump drive end of FIG. 7 to an assembly for driving not only the sprayer pump (92) off the PTO shaft (12), but also a pump (86) for providing seed planting power. Pump (91) is the type of pump shown by (13) in FIG. 1, and pump (86) is the type of pump shown by (23).

The only elements usable from the FIG. 7 structure in FIG. 6 were the pulley (16), belt (17) and snap ring (54). The pulley (16) and belt (17) drove the sprayer pump (91) via the coupler (92), and the planter pump (86) was drivingly connected to the modified coupler (89). The coupler (89) was machined to accept pulley (16), original coupler being too large, having no keyway and snap ring grooves. Both pump (86) and (91) were mounted on a tractor mounted plate (88), as by fasteners (87) or the like. The coupler (89) is directly connected to an input shaft (not shown) of the pump (86), which shaft extends through the plate (88). This prior art device has the disadvantages of changing the pumps to the extent that they must always operate together, except by making extensive and time consuming changes and further modifications, whereas applicant's pump units (13) and (22) can quickly and easily be separated for individual use, or combined as shown herein as the situation warrants.

I claim:

1. For use with a tractor or the like having a power takeoff, and adapted to pull a planter implement to which an insecticide sprayer is attached, a pump assembly for supplying hydraulic power to the planter implement and to the sprayer attachment comprising in combination:

first pump means adapted for fluid connection to the sprayer attachment for providing fluid power thereto, said first pump means including a belt drive pump having a sprocket wheel disposed adjacent a mounting arm, said mounting arm having plate means at one end thereof with an internal bore formed therein;

second pump means adapted for fluid connection to the planter implement for providing fluid power thereto, said second pump means including a pump having an internally splined element; and longitudinally aligned shaft means adapted to be removably attached to the tractor power takeoff, in driving connection with said sprocket wheel for imparting drive to said first pump means, and in driving connection with said internally splined element for imparting drive to said second pump means, said shaft means further inserted within said plate means internal bore.

2. The pump assembly of claim 1, and further wherein said driving connections are in line with each other.

3. The pump assembly of claim 1, and further wherein said driving connections are longitudinally aligned with each other.

4. The pump assembly of claim 1, and further wherein said sprocket wheel has an internal bore, and said shaft means includes a shaft extended through and releasably locked within said bore for imparting rotation to said sprocket in response to rotation of said power takeoff.

5. The pump assembly of claim 4, and further wherein said shaft means comprises a first shaft and a second shaft separable from each other.

6. The pump assembly of claim 5 and further wherein said first shaft has opposed ends, one end of which is adapted to be releasably engaged with the power takeoff, and the other end of which is releasably lockable to said sprocket wheel within said bore.

7. The pump assembly of claim 6, and further wherein said first shaft has an internal bore formed at said other end, said second shaft inserted into and releasably locked within said first shaft internal bore.

8. The pump assembly of claim 7, and further wherein said mounting arm has an internal bore formed therein aligned with said sprocket wheel internal bore, one or more bearings mounted within said mounting arm internal bore, and said second shaft extended through said one or more bearings and extended external thereof for driving engagement with said second pump internally splined element.

* * * * *